United States Patent
De Luca et al.

(10) Patent No.: US 6,410,119 B1
(45) Date of Patent: Jun. 25, 2002

(54) INFLATABLE, CUSHIONING, BUBBLE WRAP PRODUCT HAVING MULTIPLE, INTERCONNECTED, BUBBLE STRUCTURES

(75) Inventors: Nicholas P. De Luca, Mill Valley; Oliver M. Reyes, Berkeley; Philippe M. Jacques, Benicia, all of CA (US)

(73) Assignee: Free-Flow Packaging International, Inc., Redwood City, CA (US)

( * ) Notice: Subject to any disclaimer, the term of this patent is extended or adjusted under 35 U.S.C. 154(b) by 36 days.

(21) Appl. No.: 09/717,782

(22) Filed: Nov. 21, 2000

(51) Int. Cl.$^7$ ............................ B32B 3/00; B65D 81/02; B65D 81/03

(52) U.S. Cl. ................... 428/166; 428/178; 229/87.02; 206/522

(58) Field of Search ................................ 428/166, 172, 428/178; 493/967; 206/522, 814; 229/87.02

(56) References Cited

U.S. PATENT DOCUMENTS

| | | | |
|---|---|---|---|
| 3,294,387 A | * | 12/1966 | Chavannes .................. 428/166 |
| 3,389,534 A | | 6/1968 | Pendleton |
| 3,554,135 A | | 1/1971 | Duvall et al. |
| 3,575,757 A | | 4/1971 | Smith |
| 3,667,593 A | | 6/1972 | Pendleton |
| 3,769,145 A | | 10/1973 | Gresham et al. |
| 3,817,803 A | | 6/1974 | Horskey |
| 3,889,743 A | | 6/1975 | Presnick |
| 3,938,298 A | | 2/1976 | Luhman et al. |
| 4,017,351 A | | 4/1977 | Larson et al. |
| 4,096,306 A | | 6/1978 | Larson |
| 4,169,002 A | | 9/1979 | Larson |
| 4,287,520 A | * | 9/1981 | Rudy .......................... 428/166 |
| 4,415,398 A | | 11/1983 | Ottaviano |
| 4,465,188 A | | 8/1984 | Soroka et al. |
| 4,551,379 A | | 11/1985 | Kerr |
| 4,596,111 A | | 6/1986 | Ambrose |
| 4,793,123 A | | 12/1988 | Pharo |
| 4,850,912 A | | 7/1989 | Koyanagi |
| 4,872,558 A | | 10/1989 | Pharo |
| 4,874,093 A | | 10/1989 | Pharo |
| 4,918,904 A | | 4/1990 | Pharo |
| 4,941,754 A | | 7/1990 | Murdock |
| 4,949,530 A | | 8/1990 | Pharo |
| 5,009,318 A | | 4/1991 | Lepinoy |
| 5,203,761 A | | 4/1993 | Reichental et al. |
| 5,216,868 A | | 6/1993 | Cooper et al. |
| 5,340,632 A | | 8/1994 | Chappuis |
| 5,402,892 A | | 4/1995 | Jaszai |
| 5,406,770 A | | 4/1995 | Fikacek |
| 5,427,830 A | | 6/1995 | Pharo |
| 5,447,235 A | | 9/1995 | Pharo |
| 5,454,642 A | | 10/1995 | De Luca |
| 5,581,983 A | | 12/1996 | Murakami |
| 5,651,237 A | | 7/1997 | De Luca |
| 5,693,163 A | | 12/1997 | Hoover et al. |
| 5,755,082 A | | 5/1998 | Takahashi et al. |

(List continued on next page.)

*Primary Examiner*—Donald J. Loney
(74) *Attorney, Agent, or Firm*—Flehr Hohbach Test Albritton & Herbert LLP

(57) ABSTRACT

An inflatable, conformable, cushioning, packaging product comprises a plurality of individual inflatable strips of multiple bubble cushioning structures. Each individual inflatable strip has a plurality of bubble chambers with each bubble chamber interconnected to an adjacent bubble chamber by an interconnecting passageway which is smaller in size and internal volume than the bubble chambers, but which is sufficiently large to enable air volume and pressure in one inflated bubble chamber to be transmitted to adjacent bubble chambers for distributing a shock load on one bubble chamber along the entire length of the individual inflatable strip of interconnected bubble chambers. Each individual inflatable strip is defined between two laterally extending spaced apart peripheral seal line which have an undulating configuration free of corner shapes which could concentration stresses.

8 Claims, 7 Drawing Sheets

U.S. PATENT DOCUMENTS

| | | |
|---|---|---|
| 5,755,328 A | 5/1998 | De Luca |
| 5,824,392 A | 10/1998 | Gotoh et al. |
| 5,873,215 A | 2/1999 | Aquarius et al. |
| 5,901,393 A | 5/1999 | Pepe et al. |
| 5,937,614 A | 8/1999 | Watkins et al. |
| RE36,501 E | 1/2000 | Hoover et al. |
| 6,015,047 A | 1/2000 | Greenland |

\* cited by examiner

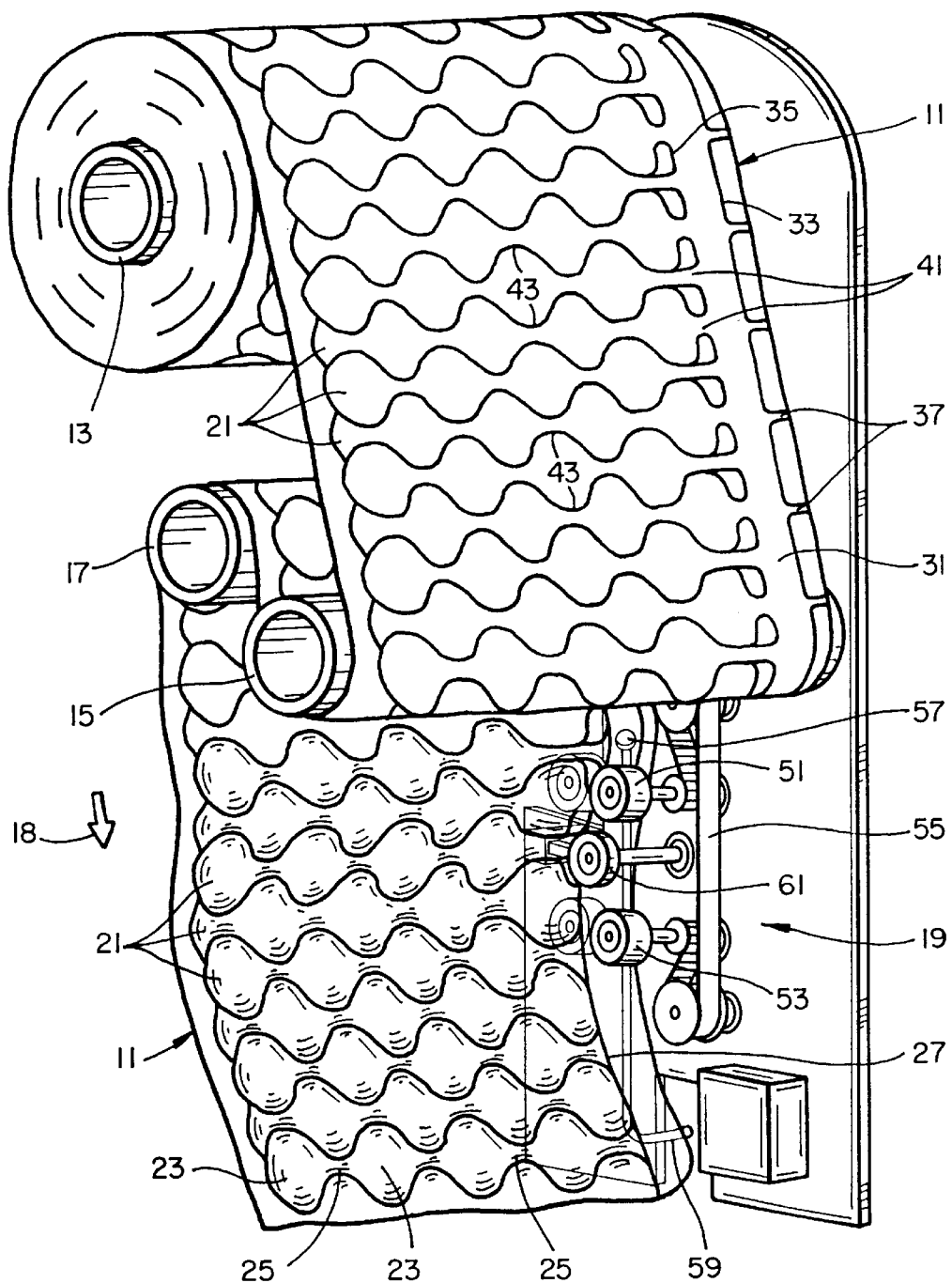
FIG_1

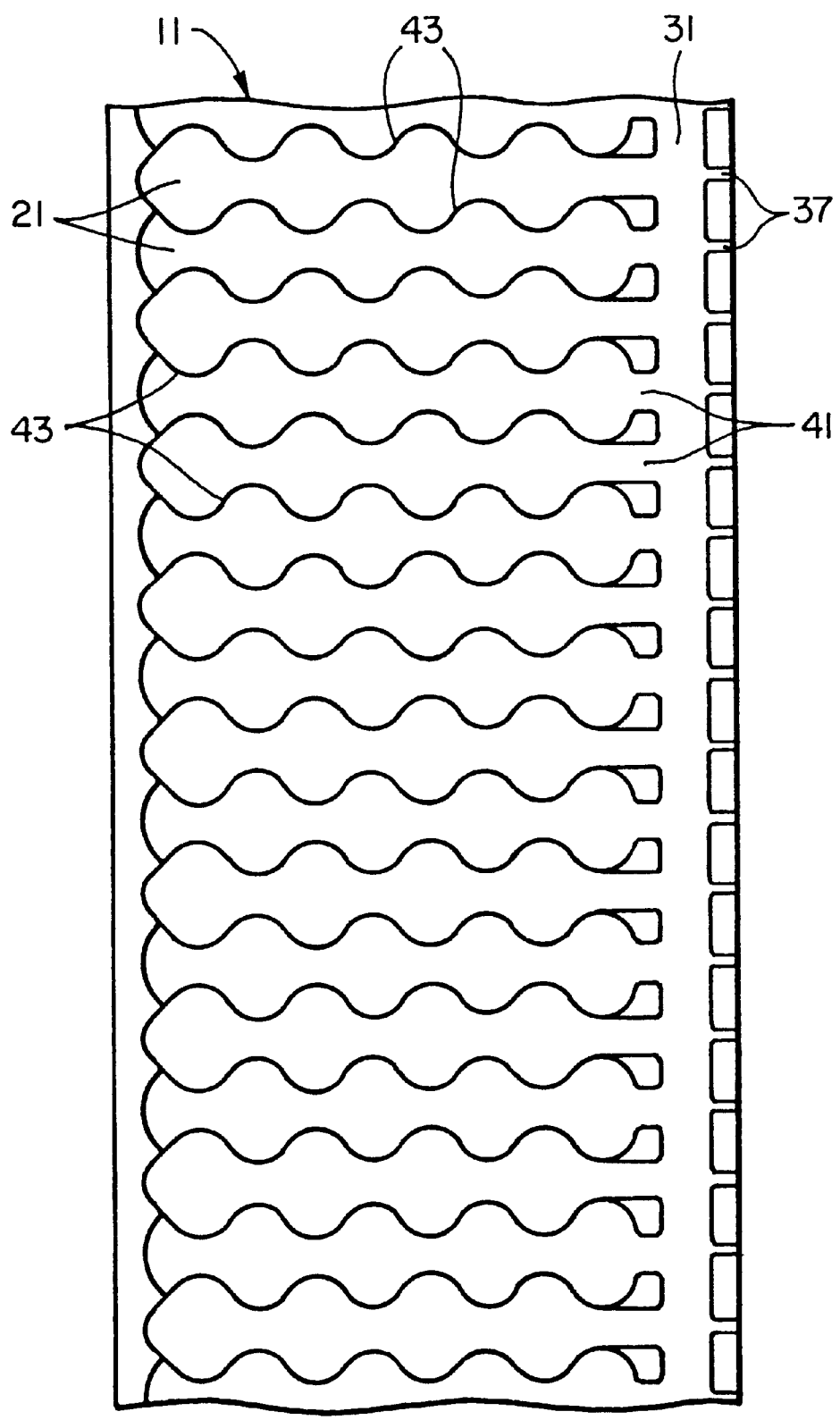
FIG_2

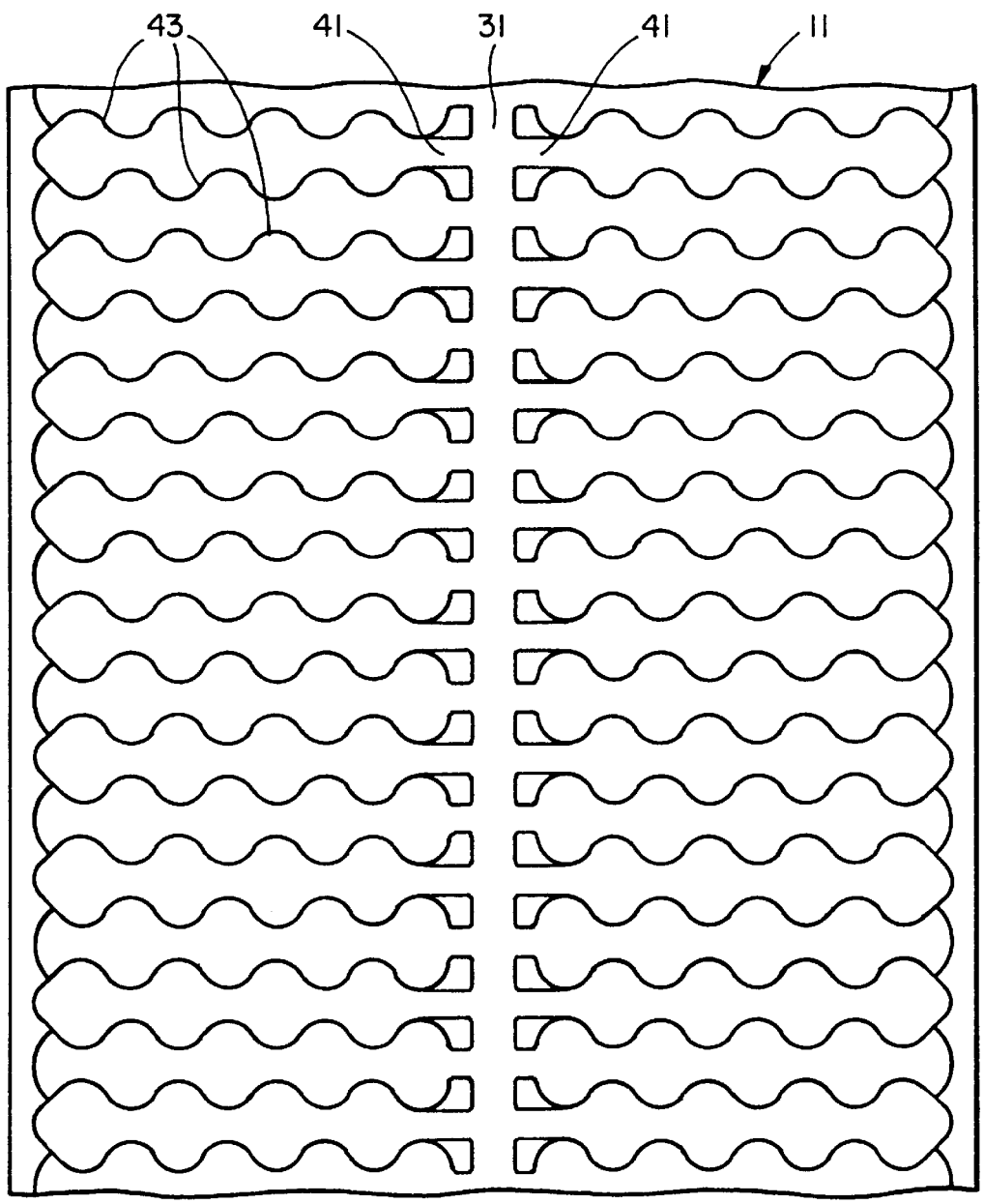
FIG_3

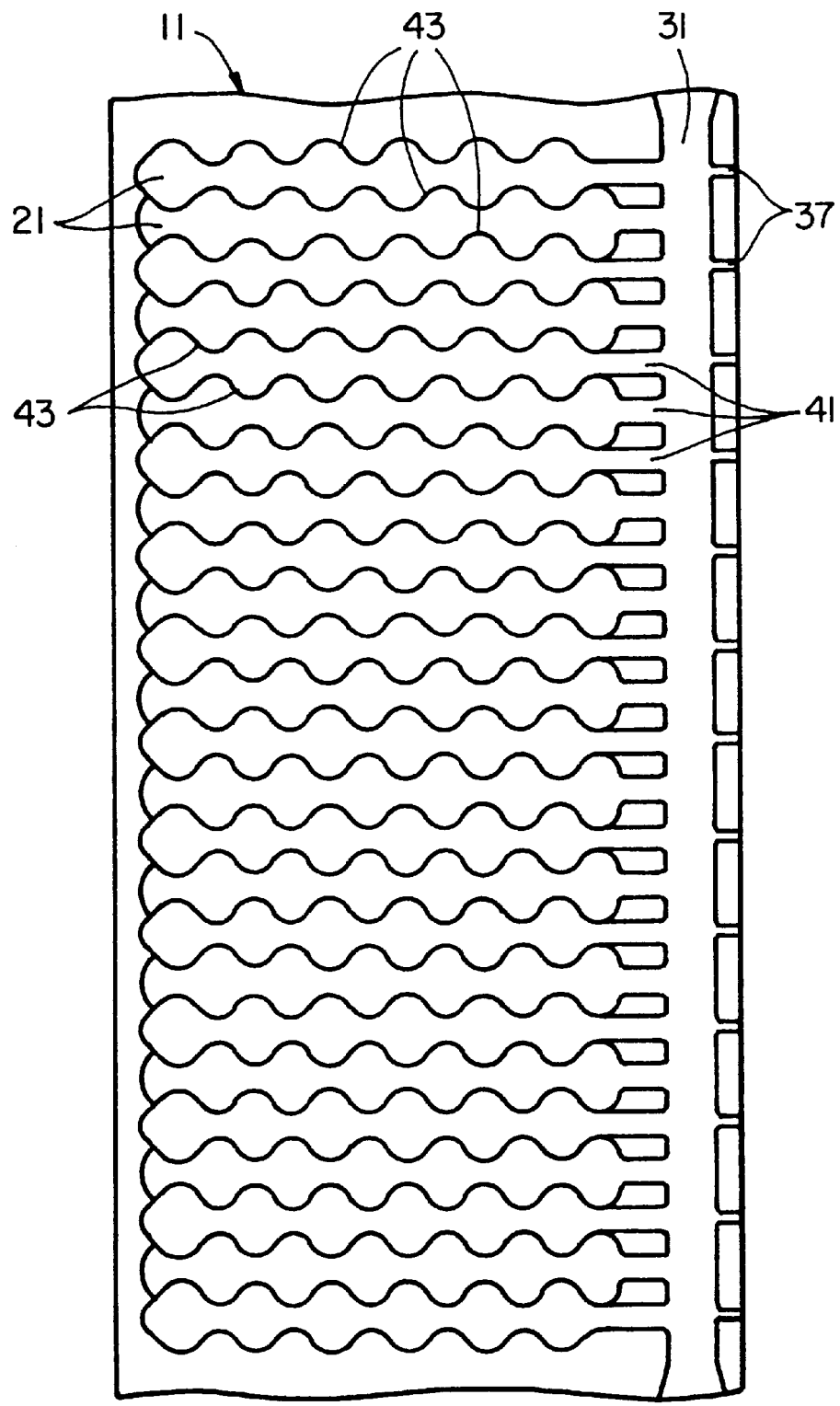
FIG_4

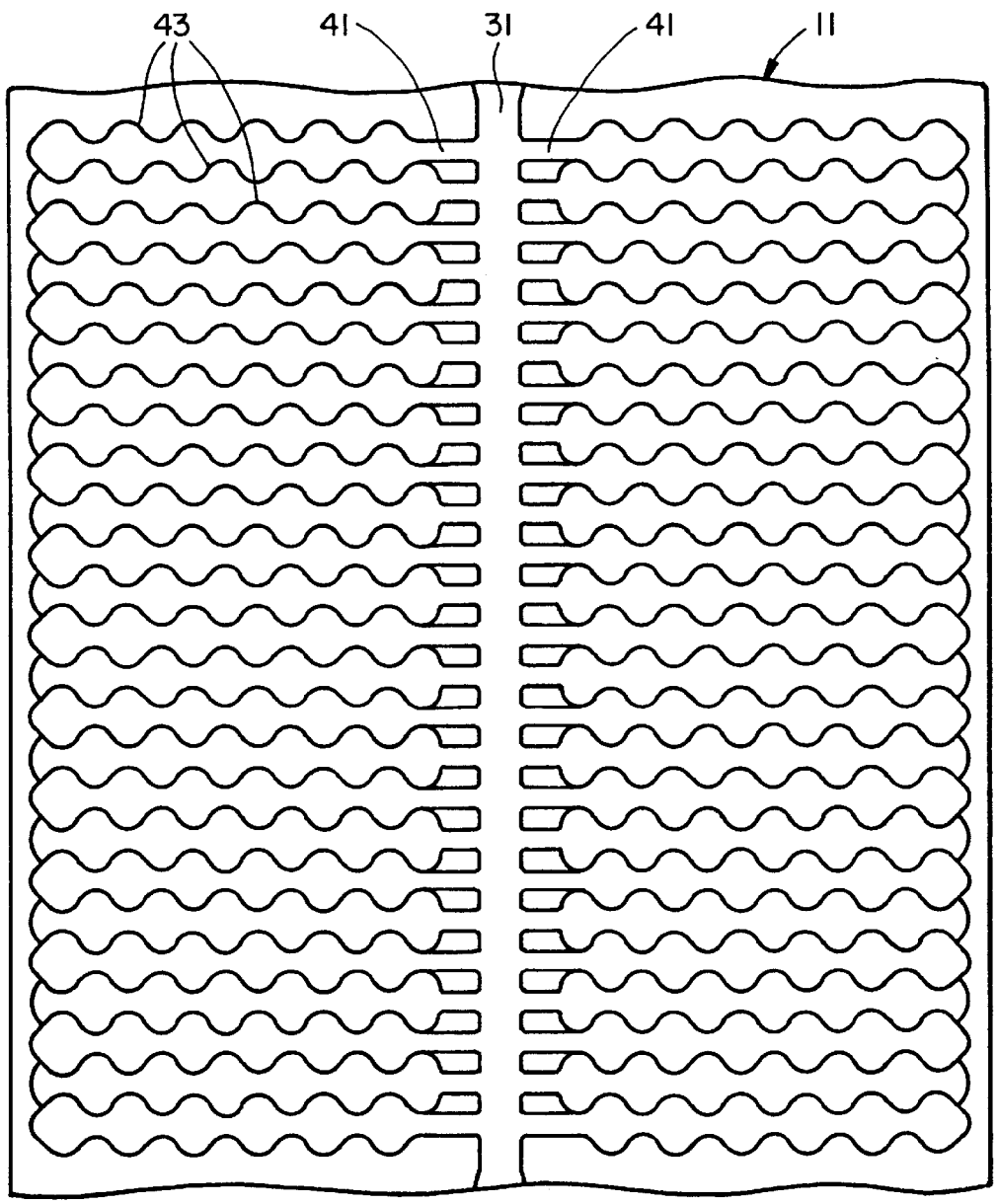
FIG_5

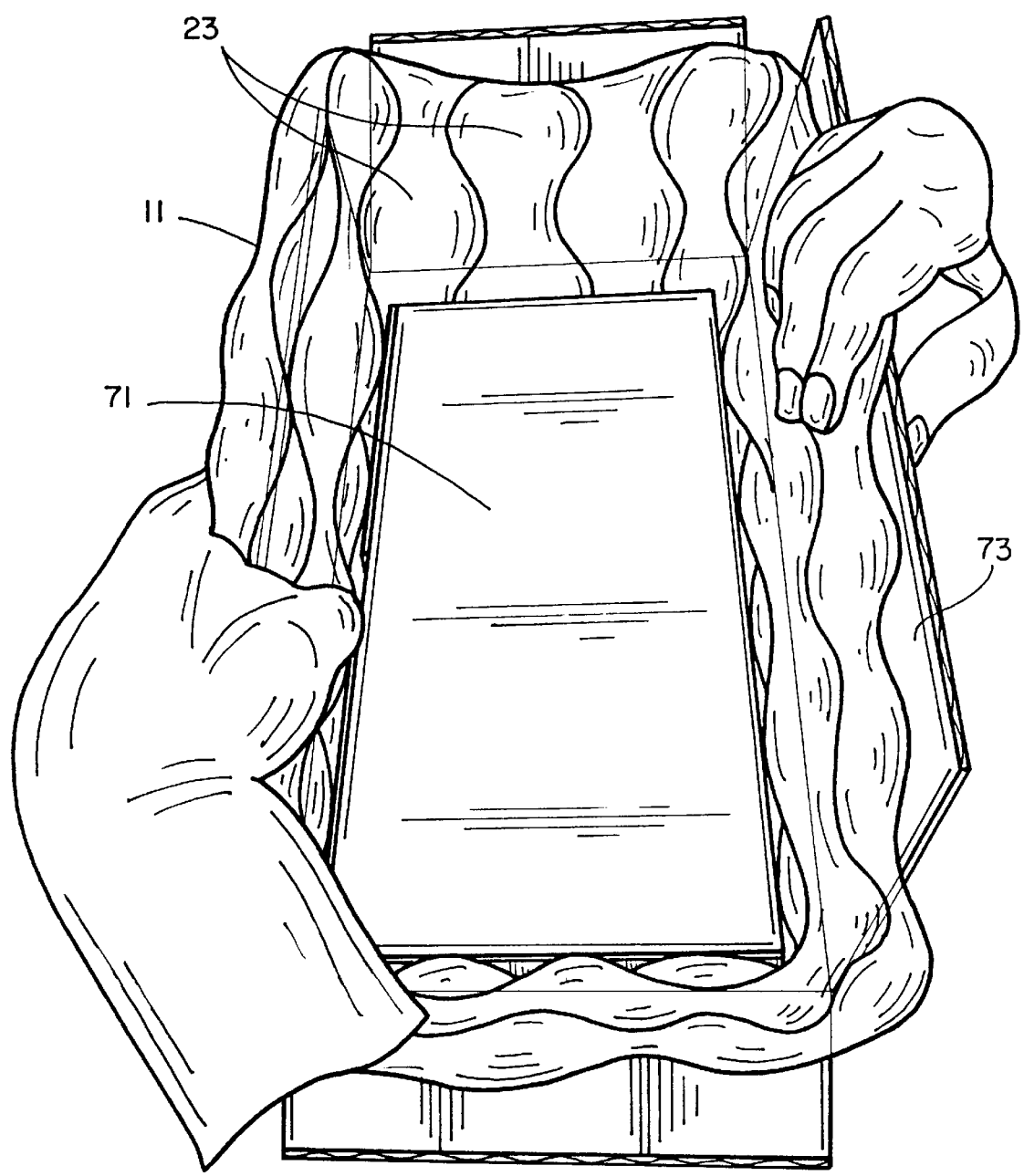
FIG_6

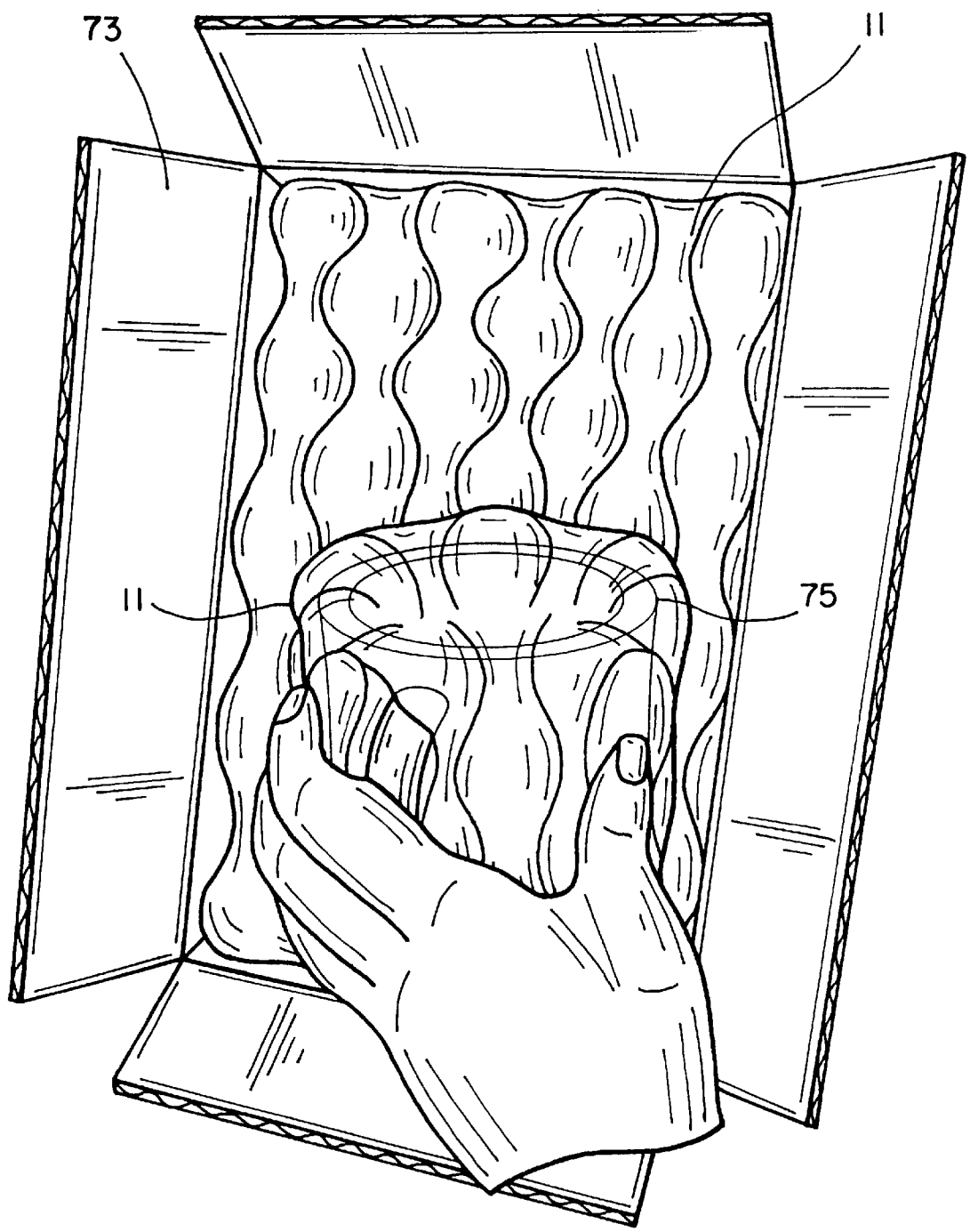
FIG_7

INFLATABLE, CUSHIONING, BUBBLE WRAP PRODUCT HAVING MULTIPLE, INTERCONNECTED, BUBBLE STRUCTURES

BACKGROUND OF THE INVENTION

This invention relates to an inflatable, cushioning, bubble wrap product.

This invention relates particularly to a bubble wrap product which has the bubbles formed in individual inflatable strips. The individual inflatable strips extend laterally across the width of a sheet of film material, and each individual inflatable strip has a plurality of bubble chambers with each bubble chamber interconnected to an adjacent bubble chamber by an interconnecting passageway. The interconnected passageway is smaller in size and in internal volume that the bubble chambers but is sufficiently large to enable air volume and pressure in one inflated bubble chamber to be transmitted to adjacent bubble chambers for distributing a shock load on one bubble chamber along the entire length of the individual inflatable strip of interconnected bubble chambers.

This invention relates particularly to a bubble wrap product in which each individual inflatable strip is defined between two laterally extending spaced apart peripheral seal lines which have an undulating configuration free of corner shapes which could concentrate stresses.

Webs of plastic film which are constructed to permit the production of patterns of air filled envelopes, cushions and pillows have (in the past ten years or so) been used extensively for cushioning objects to be transported in containers.

The thin webs incorporate two thin sheets of plastic film and are inexpensive, tough, resilient and recyclable.

Inflated pillow packagings which are created from these webs of plastic film are used for void-fill packaging to replace products such as crumpled paper or polyethylene peanuts and for protective packaging to replace molded or extruded forms.

U.S. Pat. Nos. 5,454,642; 5,651,237; 5,755,328; 4,017,351; and 5,824,392 disclose methods, apparatus, and webs of plastic film used for making strips of inflated pillow packaging of this general kind. Each of these U.S. patents is incorporated by reference in this application.

Co-pending application Ser. No. 09/207,129 filed Dec. 8, 1998 now U.S. Pat. No. 6,116,000 and entitled "Method and Apparatus for Manufacturing Air-Filled Sheet Plastic Shipping Cushions and the Like", Nicholas P. De Luca and Andrew Perkins, inventors and co-pending application Ser. No. 09/439,552 filed Nov. 12, 1999 now U.S. Pat. No. 6,209,286 and entitled "Machine and Method for Manufacturing a Continuous Production of Pneumatically Filled Inflatable Packaging Pillows", Andrew Perkins, Philipp Borchard, and Nicholas P. De Luca, inventors and co-pending application Ser. No. 09/638,843 pending filed Aug. 14, 2000 and entitled "Methods and Apparatus for Inflating and Sealing Pillows in Packaging", Andrew Perkins, Oliver M. Reyes, Phillip Borchard, and Nicholas P. De Luca, inventors also disclose methods, apparatus and webs of plastic film of this general kind. Each of these three co-pending applications is assigned to the same assignee as the assignee of this application. Each of these three co-pending applications is incorporated in this application by reference.

It is a primary object of the present invention to construct a web of two sheets of film material in a pattern of seal lines which enables an inflatable, conformable, cushioning, multiple bubble strip, packaging product to be produced which has significant functional and economic advantages over existing bubble packaging.

It is a related object to construct an inflatable packaging product which enables inflated bubble chambers to be large enough so that only a single layer of inflated packaging product can provide the necessary cushioning for many objects.

It is a related object to construct an inflatable packaging product in which substantially all of the area of the packaging product is available for inflation to provide cushioning.

It is a related object to construct an inflatable packaging product which is highly conformable to provide effective cushioning at all angles of possible shock loads on the object being shipped.

It is a related object to construct an inflatable packaging product in which the seal lines for inflatable bubble structures have an undulating configuration free of corner shapes or sharp bends which could concentrate stresses.

It is a related object to construct an inflatable packaging product having a plurality of individual inflatable strips of multiple bubble cushioning structures which extend laterally across the longitudinal length a web of inflated film material and in which each bubble chamber in an individual inflatable strip is interconnected to an adjacent bubble chamber by an interconnecting passageway which is smaller in size and internal volume than the bubble chambers but which is sufficiently large to enable air volume and pressure in one inflated bubble chamber to be transmitted to adjacent bubble chambers for distributing a shock load on one bubble chamber along the entire length of the inflatable strip of interconnected bubble chambers.

SUMMARY OF THE PRESENT INVENTION

An inflatable, conformable, cushioning, multiple bubble strip, packaging product is constructed for interposing between and engagement with both the interior surfaces of a shipping container and the outer surfaces of one or more objects packaged within the shipping container. The inflatable packaging product is constructed, when inflated, to reduce or to eliminate the transfer of shock load from the shipping container to the objects packaged within the shipping container.

The packaging product comprises a first sheet of film material and a second sheet of film material. The sheets have substantially equal lengths and substantially equal widths. The sheets are joined together as a web in a pattern of seal lines.

The pattern of seal lines form an inflation channel which extends linearly along the length of the sheets for receiving pressurized air from an outlet end of an inflation tube.

The pattern of seal lines also form a plurality of individual inflatable strips of multiple bubble cushioning structures which extend laterally from the inflation channel.

Each individual inflatable strip has a plurality of bubble chambers with each bubble chamber interconnected to an adjacent bubble chamber by an interconnecting passageway which is smaller in size and internal volume than the bubble chambers but which is sufficiently large to enable air volume and pressure in one inflated bubble chamber to be transmitted to adjacent bubble chambers for distributing a shock load on one bubble chamber along the entire length of the individual inflatable strip of interconnected bubble chambers.

Each individual inflatable strip of multiple bubble cushioning structures has an entrance port connecting the first bubble chamber in the strip to the inflation channel for receiving pressurized air at the inflation station to inflate all of the bubble chambers in the individual inflatable strip.

The entrance port is configured to permit the entrance port to be sealed by a line seal formed across the entrance port by a heated sealing element at a sealing station as the web of film material is continuously and uninterruptedly transported through the sealing station after the bubble chambers have been inflated at the inflation station.

Each individual inflatable strip is defined between two laterally extending spaced apart peripheral seal lines of the pattern. The peripheral seal lines have an undulating configuration free of corner shapes or sharp bends which could concentrate stresses.

The peripheral seal lines have a generally sinusoidal configuration as viewed from above the web formed by the two sheets.

In a preferred embodiment of the present invention the bubble chambers in one individual inflatable strip are laterally offset with respect to the bubble chambers in an immediately adjacent individual inflatable strip so that a bubble chamber in one inflatable strip is opposite an interconnecting passageway in an immediately adjacent inflatable strip.

In a preferred embodiment of the present invention a peripheral seal line on one side of a first inflatable strip is also a peripheral seal line for a second individual inflatable strip which is immediately adjacent said one side of the first inflatable strip.

In the present invention the bubble chambers can be made sufficiently large so that only a single layer of the inflated packaging product can provide the necessary cushioning for many objects.

In one embodiment of the present invention the inflation channel extends along one side edge of the web, and each individual inflatable strip extends across substantially the entire width of the web.

In another embodiment of the present invention the inflation channel extends along a center portion of the web, and the individual inflatable strips extend laterally outwardly from the central inflation channel toward the peripheral side edges of the web.

Inflatable packaging products which incorporate the features described above and which function as described above comprise additional objects of the invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view showing a bubble wrap product constructed in accordance with one embodiment of the invention. FIG. 1 shows a patterned web of the bubble wrap product in the process of being inflated and sealed. The patterned web is taken off of a storage roll and then advanced through a machine. The machine inflates bubble chambers of the patterned web at an inflation station and then seals the air in the inflated bubble chambers at a sealing station.

FIG. 2 is a top plan view of a portion of the uninflated web shown in FIG. 1.

FIG. 3 is a plan view like FIG. 2 but showing a packaging product constructed in accordance with another embodiment of the present invention. In FIG. 3 the inflation channel extends through the center portion of the web while in FIG. 2 the inflation channel extends along one side portion of the web.

FIG. 4 is a view like FIG. 2 but showing a packaging product having bubble chambers which are smaller in size than those of FIG. 2.

FIG. 5 is a view like FIG. 3 but showing a packaging product having smaller size bubble chambers.

FIG. 6 is an isometric view showing how the inflated packaging product (see the inflated product shown in the lower part of FIG. 1) is used to envelope and cushion an object to be shipped within a shipping container. In FIG. 6 the object to be shipped is a generally rectangular shaped object. FIG. 6 shows how the construction of the inflated packaging product of the present invention is readily conformable to wrap around all surfaces of the rectangular object, including the corner areas of the object, to provide cushioning against shock loads imposed at any angle on the outer shipping container. FIG. 6 also shows how the shape, size and volumes of the inflated bubble chambers are large enough so that a single layer of the packaging product can provide the necessary cushioning for the object to be shipped.

FIG. 7 is an isometric view like FIG. 6 but showing the inflated packaging product of the present invention can be wrapped about a cup to cushion the cup for shipment within the outside container.

DETAILED DESCRIPTION OF THE PREFERRED EMBODIMENTS

FIG. 1 is an isometric view showing a bubble wrap product 11 constructed in accordance with one embodiment of the present invention.

FIG. 1 shows a patterned web of the bubble wrap product 11 in the process of being inflated and sealed.

As illustrated in FIG. 1 the uninflated patterned web of the bubble wrap product 11 is stored on a storage roller 13 and is looped over guide rollers 15 and 17 as the web 11 is advanced, in the direction indicated by the block arrow 18, to and through a machine 19.

The machine 19 inflates bubble cushioning structures and interconnecting passageways with pressurized air at an inflation station and seals the pressurized air within the bubble chambers and the interconnecting passageways at a sealing station (as will be described in more detail below).

In the preferred embodiments of the present invention the bubble wrap product 11 is constructed so that the inflation and sealing can be accomplished as the web 11 is moved continuously, without interruption or intermittent stopping, through the machine 19 during a production run. This will also be described in more detail below.

The lower part of FIG. 1 shows the web 11 in its inflated form and ready for use as a cushioning packaging product.

In the inflated form individual inflated strips 21 extend laterally across the width of the web 11.

Each individual inflated strip 21 comprises a series of inflated bubble chambers 23 with each bubble chamber 23 interconnected to an adjacent bubble chamber 23 by an interconnecting passageway 25.

The interconnecting passageways 25 are smaller in size and internal volume than the bubble chambers 23, but the passageways 25 are sufficiently large to enable air volume and pressure in one inflated bubble chamber 23 to be transmitted to adjacent bubble chambers 23 for distributing a shock load (imposed on or near one bubble chamber 23) along the entire length of the individual strip 21 of interconnected bubble chambers 23.

The interconnecting passageways 25 also function to facilitate bending or creasing of the packaging product 11 by folding or bending along a line passing through the passageways 23 at any one of a number of varied angles. This function will be better understood with reference to FIGS. 6 and 7 described in more detail below. This function enables the packaging product 11 to be highly conformable to enable and to cushion the object being shipped, as also will become more apparent from a review of FIGS. 6 and 7.

A seal line 27 produced by the inflating and sealing machine 19 (see the bottom part of FIG. 1) closes one end (the right hand end as viewed in FIG. 1) of each inflated strip 21.

The length of the inflated packaging product to be used for any particular application can be determined either by cutting across the inflated web 11 or by detaching along preformed perforation lines (not shown in FIG. 1).

The seal line 27 is formed by the inflating and sealing machine 19, but the seal line pattern on the upper part of the web 11 shown in FIG. 1 is preformed either by a pressing machine or by a continuous roller mechanism.

Pattern forming machines of these kinds are disclosed in several of the U.S. patents which are incorporated by reference in this application.

The web 11 is formed of a first sheet of film material and a second sheet of film material with both sheets having substantially equal lengths and substantially widths.

The first and second sheet can be separate sheets or can be a single sheet that is folded over to provide the two sheets.

The two sheets are joined together in a web by the pattern of seal lines shown in the top part of FIG. 1.

The pattern of seal lines shown in the top part of FIG. 1 form an inflation channel 31 which extends linearly along the length of web 11.

In the particular embodiment of the packaging product 11 shown in FIG. 1, the inflation channel 31 extends along one side edge portion of the web 11.

In the embodiment shown in FIG. 3, the inflation channel 31 extends linearly along a center portion of the web 11.

The inflation channel 31 is defined between spaced apart seal lines 33 and 35.

The seal line 33 is opened at spaced intervals to provide outlet ports 37. The outlet ports 37 function to permit a certain amount of the inflation pressure in the inflation channel 31 to be vented to atmosphere.

In addition, the air that exits from the outlet ports 37 can be sensed by a pressure transducer (as described in application Ser. No. 09/638,843 pending incorporated by reference in this application) to allow for accurate position sensing of the individual inflatable strips 21 as these strips move through the machine 19. This sensing of escaping air through the outlet ports 37 can be used as signals for counting the number of strips inflated in a particular run through the machine and can also be used to stop the movement of the web 18 through the machine, after one production run of a selected number of inflated strips, at a position which is the right position to start a subsequent production run of a selected number of inflated strips 21.

The seal line 35 is open at intervals to provide entrance ports 41. The entrance ports 41 permit pressurized air from the inflation channel 31 to enter the individual inflatable strips 21 for inflating the bubble chambers 23 and interconnecting passageways 25 (as described above).

Each individual and inflatable strip 21 is defined between two laterally extending seal lines 43.

In the preferred embodiments of the invention shown in FIGS. 1–7 each laterally extending seal line 43 serves as a common boundary between two immediately adjacent inflatable strips 21 so that the only area of the inflatable portion of the web 11 which cannot be inflated and used for cushioning is the very small area of the seal lines 43 themselves.

As can best be seen by viewing the lower part of FIG. 1, the bubble chambers 23 of one individual inflatable strip 21 are offset laterally with respect to the bubble chambers 23 of an immediately adjacent individual inflatable strip 21. A bubble chamber 23 in one strip is directly opposite a passageway 25 of an immediately adjacent inflatable strip 21.

The seal line 27 shown in the lower part of FIG. 1 is formed across the inlet ports 41 at the sealing station of the machine 19 as the web 11 is transported continuously and without interruption through the sealing station and through the machine 19.

The machine 19 shown in FIG. 1 is the same as the machine illustrated and described in detail in co-pending application Ser. No. 09/638,843 pending filed Aug. 14, 2000, entitled "Methods and Apparatus for Inflating and Sealing Pillows in Packaging", Andrew Perkins, Oliver M. Reyes, Phillip Borchard, and Nicholas P. De Luca, inventors, assigned to the same assignee as the assignee of this application and incorporated by reference in this application.

A short summary of the parts of that machine as shown in FIG. 1 of the drawings in this application will now be described.

The machine 19 includes a first set of film transport rollers 51, a second set of film transport rollers 53 and a drive mechanism, including a drive belt 55, for driving the film transport rollers 51 and 53.

An outlet bulb 57 of an inflation tube 59 is positioned within the inflation channel 31 and introduces air under pressure into the inflation channel for inflating the individual inflatable strips 21 by causing pressurized air to flow through the entrance ports 41.

The outlet ports 37 which are opposite certain ones of the entrance ports 41 serve to regulate the level of the air pressure within the inflation channel 31 (as described in more detail in co-pending application Ser. No. 09/638,843 incorporated by reference in this application).

The seal line 27 is formed across the entrance ports 41 as the strip of the film which contains the entrance ports 41 is passed through a sealing station. The film is engaged with a sealing wheel 61 on one side of the film 11 and is engaged with a heated sealing element on the other side of the film. The heated sealing element includes a fabric covered, electrically heated Nicrom wire.

A slitting station (not shown in FIG. 1 but described in application Ser. No. 09/638,843 pending) slits the inflation channel 31 to permit the web 11 to pass over the inflation tube 59 after the seal line 27 has been formed by the machine 19.

The pressure of the inflation air can range from ½ pounds per square inch gauge to 10 pounds per square inch gauge.

The material of the two sheets making up the web 11 can be low density polyethylene or can be high density polyethylene. The thickness of the web 11 can be one mil to ten mils.

The height of an inflated bubble chamber 23 can be from ¼ inch to 9 inches.

The configuration of each seal line 43, as viewed from above in FIG. 1, is, in the preferred embodiments of the present invention, a wavy, undulating, curved configuration without corners or sharp bends that could concentrate stresses.

In a specific embodiment as illustrated in FIGS. 1–7 of the drawings, the configuration of a seal line 43 is generally sinusoidal, as viewed from directly above.

The center line of each individual inflatable strip 21 preferably extends orthogonally across the width of the web 11, but the center line could be itself a wavy configuration and could extend at some angle other than directly orthogonal.

FIG. 2 is an enlarged top plan view of a web 11 having the line pattern structure shown in the top part of FIG. 1.

FIG. 3 is a plan view like FIG. 2 but shows a packaging product constructed in accordance with another embodiment of the present invention. In FIG. 3 the inflation channel 31 extends through the center portion of the web 11.

In FIG. 2 the inflation channel 11 extends along one side portion of the web 11.

The embodiment of the patterned web 11 shown in FIG. 3 is inflated and sealed by an apparatus and method described in detail in co-pending application Ser. No. 09/439,552 filed Nov. 12, 1999, now U.S. Pat. No. 6,209,286 and titled "Machine and Method for Manufacturing a Continuous Production of Pneumatically Filled Inflatable Packaging Pillows", Andrew Perkins, Nicholas P. De Luca, and Phillip Borchard, inventors, and assigned to the same assignee as the assignee of this application, and incorporated by reference in this application.

In the embodiment shown in FIG. 3, two seal lines 27 are formed alongside the inflation channel 31 and across the inlet ports 41.

FIG. 4 is a view like FIG. 2 but showing a packaging product having bubble chambers which are smaller in size than those of FIG. 2.

FIG. 5 is a view like FIG. 3 but showing a packaging product having smaller size bubble chambers than FIG. 3.

FIG. 6 is an isometric view showing how the inflated packaging product 11 of the present invention is used to cushion a generally rectangular shaped object 71 within a shipping container 73.

FIG. 6 shows how the individual bubble chambers 23 are effectively engaged with all outer surfaces of the object 71 to envelope the object 71 within the conformable inflated packaging product 11.

As noted above, the interconnecting passageways 25 in particular are readily foldable and bendable along lines as needed to facilitate conforming of the inflated packaging product 11 to the particular object being shipped. The construction of the individual inflatable strips which permits a certain amount of bending or compressing of some parts of the inflated strip (by transferring pressurized air to other parts of the inflated strip) also facilitates conformation of the packaging product to the configuration of the object being shipped.

The conformability of the packaging product (the ability to wrap all surfaces of the object, including corner areas of the object) provides cushioning against shock loads imposed at any angle on the outer shipping container 11.

FIG. 6 also shows how the shape, size and volumes of the inflated bubble chambers 23 are large enough so that a single layer of the packaging product 11 can provide necessary cushioning for the object to be shipped.

FIG. 7 is an isometric view like FIG. 6 but shows the inflated packaging product 11 wrapped about a cup 75 to cushion the cup for shipment within the outer container 73.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. An inflatable, conformable, cushioning, multiple bubble strip, packaging product constructed for interposing between and in engagement with both the interior surfaces of a shipping container and the outer surfaces of one or more objects packaged within the shipping container and also constructed, when inflated, to reduce or to eliminate the transfer of shock loads from the shipping container to the objects packaged within the shipping container, said packaging product comprising, a first sheet of film material, a second sheet of film material, said sheets having substantially equal lengths and substantially equal widths, said sheets being joined together as a web in a pattern of seal lines, said pattern of seal lines forming an inflation channel extending linearly along the length of the sheets for receiving pressurized air from an outlet end of an inflation tube disposed within the inflation channel at an inflation station as the sheets are transported past the sealing station in the process of inflating and sealing strips of multiple bubble cushioning structures in the packaging product, said pattern of seal lines also forming a plurality of individual inflatable strips of multiple bubble cushioning structures extending laterally from said inflation channel, each individual inflatable strip having a plurality of bubble chambers with each bubble chamber interconnected to an adjacent bubble chamber by an interconnecting passageway which is smaller in size and internal volume than the bubble chambers but which is sufficiently large to enable air volume and pressure in one inflated bubble chamber to be transmitted to adjacent bubble chambers for distributing a shock load on one bubble chamber along the entire length of the individual inflatable strip of interconnected bubble chambers, each individual inflatable strip of multiple bubble cushioning structures having an entrance port connecting the first bubble chamber in the strip to the inflation channel for receiving pressurized air at the inflation station to inflate all of the bubble chambers in the individual inflatable strip, said entrance port being configured to permit the entrance port to be sealed by a line seal formed across the entrance port by a heated sealing element at a sealing station as the sheets of film material are continuously and uninterruptedly transported through the sealing station after the bubble chambers have been inflated at the inflation station, and each individual inflatable strip being defined between two laterally extending spaced apart peripheral seal lines which have an undulating configuration free of corner shapes or sharp bends which could concentrate stresses.

2. The invention defined in claim 1 wherein said peripheral seal lines have a generally sinusoidal configuration as viewed from above the sheets.

3. The invention defined in claim 1 wherein the bubble chambers in one individual inflatable strip are laterally offset with respect to the bubble chambers in an immediately adjacent individual inflatable strip so that a bubble chamber in one inflatable strip is opposite an interconnecting passageway in an immediately adjacent inflatable strip.

4. The invention defined in claim 3 wherein a peripheral seal line on one side of a first individual inflatable strip is also a peripheral seal line for a second individual inflatable strip immediately adjacent said one side of the first individual inflatable strip.

5. The invention defined in claim 1 wherein the bubble chambers are sufficiently large that only a single layer of the inflated packaging product can provide the necessary cushioning for many objects.

6. The invention defined in claim 5 wherein the height of a bubble chamber when inflated is substantially ½ inches.

7. The invention defined in claim 1 wherein the inflation channel extends along one side edge of the web and each individual inflatable strip extends across substantially the entire width of the web.

8. The invention defined in claim 1 wherein the inflation channel extends along a center portion of the web and the individual inflatable strips extend laterally outwardly from the central inflation channel toward the peripheral side edges of the web.

* * * * *

(12) EX PARTE REEXAMINATION CERTIFICATE (5694th)
United States Patent
De Luca et al.

(10) Number: US 6,410,119 C1
(45) Certificate Issued: Mar. 6, 2007

(54) INFLATABLE, CUSHIONING, BUBBLE WRAP PRODUCT HAVING MULTIPLE, INTERCONNECTED, BUBBLE STRUCTURES

(75) Inventors: Nicholas P. De Luca, Mill Valley, CA (US); Oliver M. Reyes, Berkeley, CA (US); Philippe M. Jacques, Benicia, CA (US)

(73) Assignee: Free-Flow Packaging International, Inc., Redwood City, CA (US)

Reexamination Request:
No. 90/007,689, Aug. 22, 2005

Reexamination Certificate for:
Patent No.: 6,410,119
Issued: Jun. 25, 2002
Appl. No.: 09/717,782
Filed: Nov. 21, 2000

(51) Int. Cl.
*B32B 3/00* (2006.01)
*B65D 81/02* (2006.01)
*B65D 81/03* (2006.01)

(52) U.S. Cl. .................. 428/166; 428/178; 229/87.02; 206/522

(58) Field of Classification Search ............... None
See application file for complete search history.

(56) References Cited

U.S. PATENT DOCUMENTS

| | | |
|---|---|---|
| 2,904,100 A | 9/1959 | Fener |
| 3,253,122 A | 5/1966 | Kochmer et al. |
| 3,359,703 A | 12/1967 | Quaadgras |
| 3,389,534 A | 6/1968 | Pendelton |
| 3,492,783 A | 2/1970 | Dohmeier |
| 3,554,135 A | 1/1971 | Duvall et al. |
| 3,575,757 A | 4/1971 | Smith |
| 3,660,189 A | 5/1972 | Troy |
| 3,667,593 A | 6/1972 | Pendleton |
| 3,674,614 A | 7/1972 | Templeton |

(Continued)

FOREIGN PATENT DOCUMENTS

| | | |
|---|---|---|
| DE | 297 17 551 U1 | 3/1998 |
| DE | 199 13 408 C2 | 10/2000 |
| DE | 199 13 408 A1 | 10/2000 |
| EP | 0836926 A2 | 4/1998 |
| FR | 2389547 | 12/1978 |
| FR | 2580597 | 10/1986 |
| GB | 2218401 A | 11/1989 |
| JP | 7/16961 | 1/1995 |
| JP | 7/165267 | 6/1995 |
| WO | WO 94/07678 | 4/1994 |

(Continued)

OTHER PUBLICATIONS

Claims from 10/031,111 (PCT/NL01/00351).
Fuss and Yampolsky declaration, 09/488,622.
Air–Fil 1200 photographs (no date but prior to application's filing date).

*Primary Examiner*—Stephen Stein

(57) ABSTRACT

An inflatable, conformable, cushioning, packaging product comprises a plurality of individual inflatable strips of multiple bubble cushioning structures. Each individual inflatable strip has a plurality of bubble chambers with each bubble chamber interconnected to an adjacent bubble chamber by an interconnecting passageway which is smaller in size and internal volume than the bubble chambers, but which is sufficiently large to enable air volume and pressure in one inflated bubble chamber to be transmitted to adjacent bubble chambers for distributing a shock load on one bubble chamber along the entire length of the individual inflatable strip of interconnected bubble chambers. Each individual inflatable strip is defined between two laterally extending spaced apart peripheral seal line which have an undulating configuration free of corner shapes which could concentration stresses.

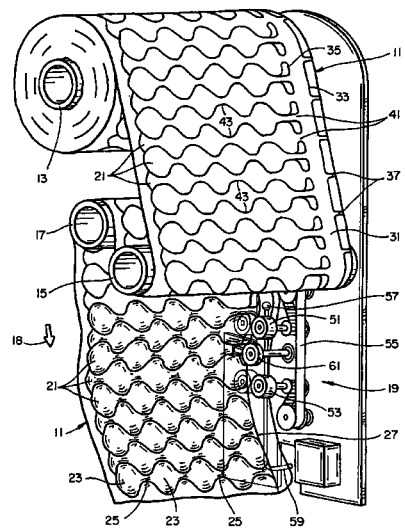

U.S. PATENT DOCUMENTS

| | | |
|---|---|---|
| 3,703,430 A | 11/1972 | Rich |
| 3,769,145 A | 10/1973 | Gresham et al. |
| 3,817,803 A | 6/1974 | Horskey |
| 3,868,285 A | 2/1975 | Troy |
| 3,889,743 A | 6/1975 | Presnick |
| 3,938,298 A | 2/1976 | Luhman et al. |
| 4,017,351 A | 4/1977 | Larson et al. |
| 4,021,283 A | 5/1977 | Weikert |
| 4,096,306 A | 6/1978 | Larson |
| 4,169,002 A | 9/1979 | Larson |
| 4,415,398 A | 11/1983 | Ottayiano |
| 4,465,188 A | 8/1984 | Soroka et al. |
| 4,551,379 A | 11/1985 | Kerr |
| 4,564,407 A | 1/1986 | Tsuruta |
| 4,586,319 A | 5/1986 | Ausnit |
| 4,596,111 A | 6/1986 | Ambrose |
| 4,680,073 A | 7/1987 | Brunner et al. |
| 4,793,123 A | 12/1988 | Pharo |
| 4,847,126 A | 7/1989 | Yamashiro et al. |
| 4,850,912 A | 7/1989 | Koyanagi |
| 4,872,558 A | 10/1989 | Pharo |
| 4,874,093 A | 10/1989 | Pharo |
| 4,918,904 A | 4/1990 | Pharo |
| 4,941,754 A | 7/1990 | Murdock |
| 4,949,530 A | 8/1990 | Pharo |
| 4,981,006 A | 1/1991 | Caenazzo et al. |
| 5,009,318 A | 4/1991 | Lepinoy |
| 5,046,258 A | 9/1991 | Cahill et al. |
| 5,203,761 A | 4/1993 | Reichental et al. |
| 5,216,868 A | 6/1993 | Cooper et al. |
| 5,340,632 A | 8/1994 | Chappuis |
| 5,351,828 A | 10/1994 | Becker et al. |
| 5,402,892 A | 4/1995 | Jaszai |
| 5,406,770 A | 4/1995 | Fikacek |
| 5,427,830 A | 6/1995 | Pharo |
| 5,447,235 A | 9/1995 | Pharo |
| 5,454,642 A | 10/1995 | De Luca |
| 5,535,888 A | 7/1996 | De Luca |
| 5,552,003 A | 9/1996 | Hoover et al. |
| 5,581,983 A | 12/1996 | Murakami |
| 5,604,016 A | 2/1997 | Allegre |
| 5,651,237 A | 7/1997 | De Luca |
| 5,658,632 A | 8/1997 | Krabill |
| 5,660,662 A | 8/1997 | Testone |
| 5,692,833 A | 12/1997 | De Luca |
| 5,693,163 A | 12/1997 | Hoover et al. |
| 5,755,082 A | 5/1998 | Takahashi et al. |
| 5,755,328 A | 5/1998 | De Luca |
| 5,824,392 A | 10/1998 | Gotoh et al. |
| 5,826,723 A | 10/1998 | Jaszai |
| 5,858,153 A | 1/1999 | Mack |
| 5,873,215 A | 2/1999 | Aquarius et al. |
| 5,937,614 A | 8/1999 | Watkins et al. |
| 5,942,076 A | 8/1999 | Salerno et al. |
| RE36,501 E | 1/2000 | Hoover et al. |
| 6,015,047 A | 1/2000 | Greenland |
| 6,209,286 B1 | 4/2001 | Perkins et al. |
| 6,272,815 B1 | 8/2001 | Todd et al. |
| 6,375,785 B1 | 4/2002 | Aquarius |
| 6,410,119 B1 | 6/2002 | De Luca et al. |
| 6,423,166 B1 | 7/2002 | Simhaee |
| 6,460,313 B1 | 10/2002 | Cooper |
| 6,582,800 B2 | 6/2003 | Fuss et al. |
| 6,659,150 B1 | 12/2003 | Perkins et al. |
| 6,786,022 B2 | 9/2004 | Fuss et al. |
| 6,982,113 B2 * | 1/2006 | Kannankeril et al. ....... 428/166 |
| 2003/0118778 A1 | 6/2003 | Perkins et al. |
| 2004/0206050 A1 | 10/2004 | Fuss et al. |

FOREIGN PATENT DOCUMENTS

| | | |
|---|---|---|
| WO | WO 98/40276 | 9/1998 |
| WO | WO 00/43198 | 7/2000 |
| WO | WO 00/43270 | 7/2000 |
| WO | WO 00/53501 | 9/2000 |
| WO | WO 00 64672 | 11/2000 |
| WO | WO 01/85434 A2 | 11/2001 |

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *